UNITED STATES PATENT OFFICE.

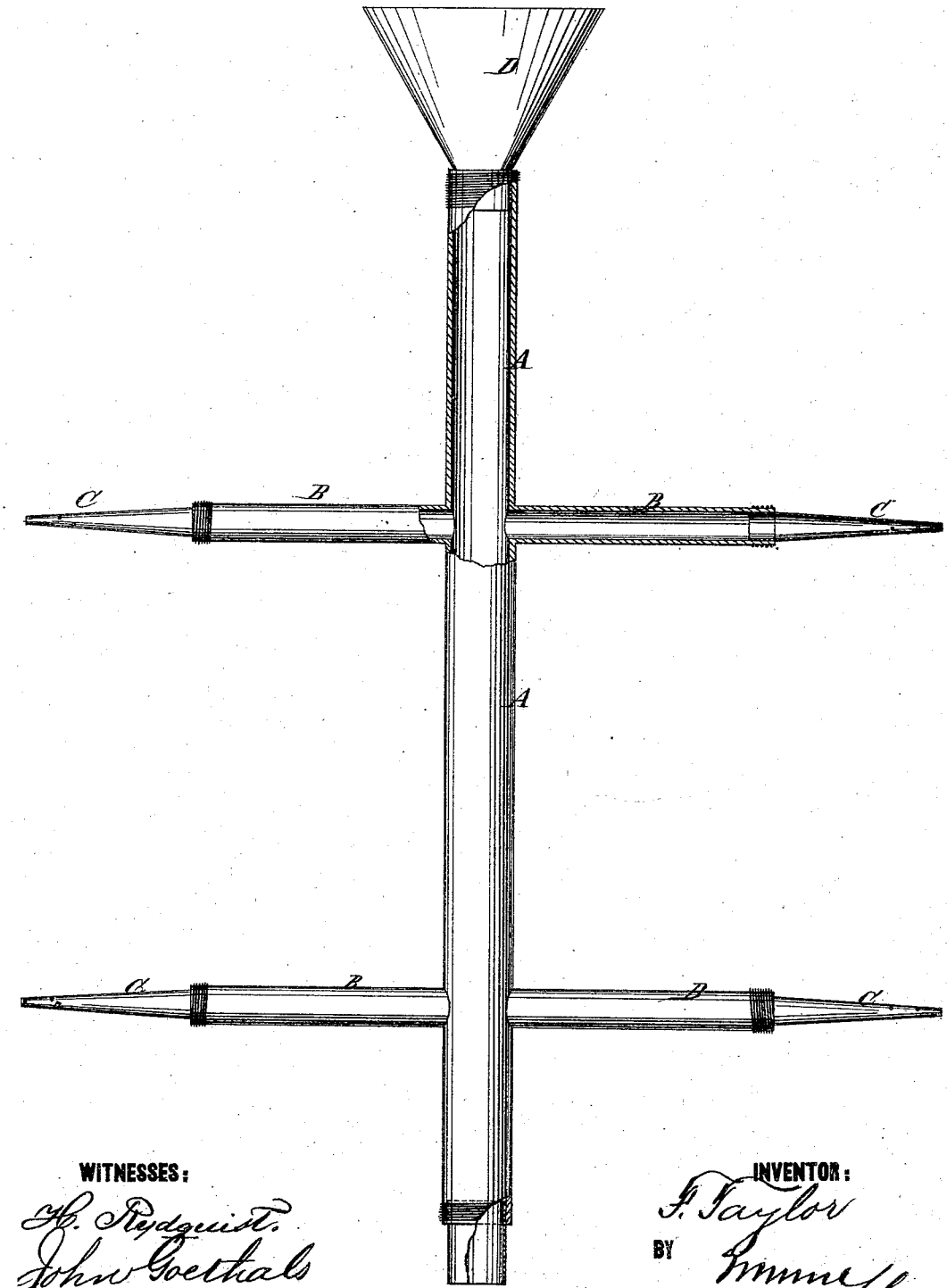

FREDERICK TAYLOR, OF COVINGTON, PENNSYLVANIA.

IMPROVEMENT IN IRRIGATING APPARATUS.

Specification forming part of Letters Patent No. 182,613, dated September 26, 1876; application filed June 12, 1876.

*To all whom it may concern:*

Be it known that I, FREDERICK TAYLOR, of Covington, in the county of Tioga and State of Pennsylvania, have invented a new and Improved Irrigating Apparatus, of which the following is a specification:

My invention consists of a tube with a pointed and perforated end to be set in the ground near the plants, and hold the water for slowly escaping through the perforations and gently moistening the ends of the plants; and it also consists of a number of these conically-pointed and perforated tubes attached to a main pipe for holding the water to irrigate a number of plants or hills from one supply, the pointed pipes being attached so as to project laterally from the main pipe.

The drawing represents my improved irrigating apparatus, partly in plan view, and partly in section.

A is the main pipe, and B the lateral branch pipes, having a conical and perforated nozzle, C, on the end to be laid on or inserted in the ground at the roots of the plants to be irrigated, and furnish a steady supply of water in small quantities for a considerable time, the pipe A being so arranged as to furnish the supply in any way, say by having the filling end raised to maintain a column of water for passing out at the nozzle. It will also have a funnel, D, to facilitate the filling of the tube.

These pointed and perforated irrigators may be used independently of the main pipe by setting them upright on the point in the ground and filling them, and I propose to so use them as well as in connection with the main pipe.

For elevating the main pipe, and for adjusting the laterals as required, they will probably be made of flexible material; but the points will be of metal.

I am aware that perforated nozzles of conical form are not in themselves new; but

What I claim is—

An irrigator consisting of the main pipe A and branch pipes B, the latter provided with pointed tubes at the end, substantially as and for the purpose specified.

FRED. TAYLOR.

Witnesses:
C. H. GOLDSMITH,
JOHN A. MARTIN.